United States Patent
Cho et al.

(10) Patent No.: US 9,972,835 B2
(45) Date of Patent: May 15, 2018

(54) POSITIVE ACTIVE MATERIAL FOR RECHARGEABLE LITHIUM BATTERY, METHOD FOR MANUFACTURING THE SAME, AND RECHARGEABLE LITHIUM BATTERY INCLUDING THE SAME

(71) Applicant: UNIST ACADEMY-INDUSTRY RESEARCH CORPORATION, Ulsan (KR)

(72) Inventors: Jaephil Cho, Ulsan (KR); Mi-Jung Noh, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 105 days.

(21) Appl. No.: 14/515,526

(22) Filed: Oct. 16, 2014

(65) Prior Publication Data

US 2015/0228969 A1  Aug. 13, 2015

(30) Foreign Application Priority Data

Feb. 11, 2014  (KR) .................. 10-2014-0015519

(51) Int. Cl.
| | |
|---|---|
| *H01M 4/36* | (2006.01) |
| *H01M 4/525* | (2010.01) |
| *H01M 4/04* | (2006.01) |
| *H01M 4/1391* | (2010.01) |
| *C01G 53/00* | (2006.01) |
| *H01M 10/052* | (2010.01) |
| *H01M 4/505* | (2010.01) |

(Continued)

(52) U.S. Cl.
CPC ............ *H01M 4/366* (2013.01); *C01G 53/42* (2013.01); *C01G 53/50* (2013.01); *H01M 4/0471* (2013.01); *H01M 4/1391* (2013.01); *H01M 4/525* (2013.01); *C01P 2002/52* (2013.01); *C01P 2006/40* (2013.01); *H01M 4/483* (2013.01); *H01M 4/485* (2013.01); *H01M 4/505* (2013.01); *H01M 10/052* (2013.01)

(58) Field of Classification Search
None
See application file for complete search history.

(56) References Cited

U.S. PATENT DOCUMENTS

2003/0054250 A1* 3/2003 Kweon ................. H01M 4/131
429/231.1

FOREIGN PATENT DOCUMENTS

| | | |
|---|---|---|
| JP | 2013-077420 | 4/2013 |
| KR | 10-2000-0059999 | 10/2000 |
| KR | 10-2009-0030087 | 3/2009 |

(Continued)

OTHER PUBLICATIONS

Xiong et al. J. Mater. Chem. A, 2013, 1, 1284-1288 (Nov. 2012).*

(Continued)

*Primary Examiner* — Wojciech Haske
(74) *Attorney, Agent, or Firm* — Lex IP Meister, PLLC

(57) ABSTRACT

Disclosed are a positive active material for a rechargeable lithium battery including a nickel-containing lithium transition metal composite oxide and a coating layer positioned on the surface of the lithium transition metal composite oxide, wherein the coating layer includes vanadium oxide, lithium vanadium oxide, or a combination thereof, a method of manufacturing the same, and a rechargeable lithium battery including the same.

6 Claims, 22 Drawing Sheets

(51) Int. Cl.
   *H01M 4/48*     (2010.01)
   *H01M 4/485*    (2010.01)

(56) References Cited

FOREIGN PATENT DOCUMENTS

| KR | 10-2010-0013513 | 2/2010 |
| KR | 10-2012-0087540 | 8/2012 |
| KR | 10-2013-0095572 | 8/2013 |

OTHER PUBLICATIONS

Notice of Allowance, Korea Intellectual Property Office, dated Dec. 16, 2015, Korean Patent Application No. 10-2014-0015519.

J. Gao et al. "High capacity Li[Li0.2Mn0.54Ni0.13Co0.13]O2—V2O5 composite cathodes with low irreversible capacity loss for lithium ion batteries", Electrochemistry Communications vol. 11 (Jan. 2009) 84-86, The University of Texas at Austin, Austin, TX 78712, USA.

Xunhui Xiong et al., "Role of V2O5 coating on LiNiO2-based materials for lithium ion battery", Journal of Power Sources vol. 245, Jan. 2014, p. 183-193.

\* cited by examiner

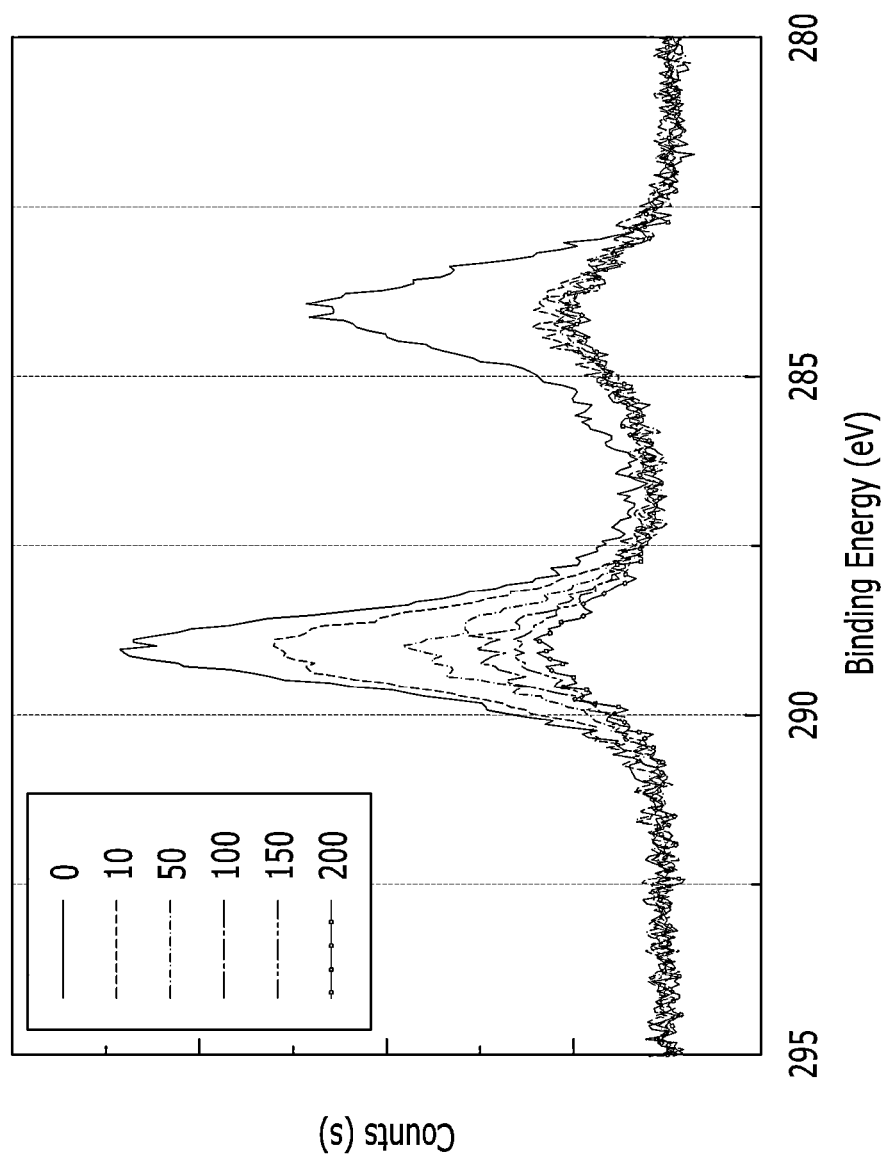

POSITIVE ACTIVE MATERIAL FOR RECHARGEABLE LITHIUM BATTERY, METHOD FOR MANUFACTURING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2014-0015519 filed in the Korean Intellectual Property Office on Feb. 11, 2014, the entire contents of which are incorporated herein by reference.

BACKGROUND OF THE INVENTION (a) Field of the Invention

A positive active material for a rechargeable lithium battery, a method for manufacturing the same, and a rechargeable lithium battery including the same are disclosed.

(b) Description of the Related Art

In recent times, portable electronic equipment with a reduced size and weight has been increasingly used in accordance with developments in the electronics industry.

Batteries generate electrical power using electrochemical reaction materials for a positive electrode and a negative electrode. Lithium rechargeable batteries generate electrical energy from changes of chemical potential during intercalation/deintercalation of lithium ions at the positive and negative electrodes.

Lithium rechargeable batteries use materials that reversibly intercalate or deintercalate lithium ions during charge and discharge reactions for both positive and negative active materials, and contain an electrolyte between the positive electrode and the negative electrode.

For positive active materials of a rechargeable lithium battery, lithium-transition element composite oxides being capable of intercalating lithium such as $LiCoO_2$, $LiMn_2O_4$, $LiNiO_2$, $LiNi_{1-x}Co_xO_2$ ($0<x<1$), $LiMnO_2$, and the like have been researched.

Among the above materials, a lithium nickel-based oxide is less expensive than a cobalt-based oxide but secures high discharge capacity when charged at 4.3 V, and thus, a doped lithium nickel-based oxide realizes reversible capacity near about 200 mAh/g, which is greater than capacity of the $LiCoO_2$ (about 165 mAh/g). Accordingly, a lithium nickel-based positive active material has improved energy density despite a somewhat low discharge voltage and volumetric density, and thus is commercially available for a high-capacity battery.

In particular, active research on a nickel-rich-based positive active material has been recently made to develop a high-capacity battery.

However, the nickel-rich-based positive active material has the largest problem of structure stability at a high temperature and lithium impurities such as $Li_2CO_3$ and LiOH remaining on the surface during synthesis. The lithium impurities remaining on the surface react with $CO_2$ or $H_2O$ in the air and form $Li_2CO_3$. In addition, $Ni^{3+}$ ions are reduced into $Ni^{2+}$ ions during exposure in the air for a long time, under an increasing partial pressure of $CO_2$, or during an electrochemical reaction, which directly decreases capacity.

In addition, lithium impurities act as a factor of determining pH of an active material, and an active material having high pH causes gelation during manufacture of an electrode slurry and deteriorates uniformity of an electrode plate and thus is not appropriate for commercialization. Furthermore, the $Li_2CO_3$ has a decomposition reaction during an electrochemical reaction and mainly generates gas as well as causes a problem of forming initial irreversible capacity, hindering movement of lithium ions on the surface, and the like.

Accordingly, a great deal of research on a surface treatment to secure structure stability of the nickel-based positive active material and to suppress a side reaction on the surface has been made. A representative surface treatment material for securing the surface stability includes various metals such as Ag and the like, metal oxides such as $Al_2O_3$, $ZrO_2$, $CeO_2$, and the like, metal phosphates, metal fluorides such as $ZrF_2$, $AlF_3$, $SrF_2$, and the like, carbon compounds, and the like. However, a conventional surface treatment material acts as an insulator and is unfavorable in terms of battery conductivity and lithium ion conductivity, and thus causes a problem of deteriorating initial capacity, increasing initial resistance, or the like. In addition, the lithium impurities remaining on the surface are not removed through coating, and thus attempts to remove them through reheat-treatment, washing, or the like have been made, but they are recrystallized during cooling when reheat-treated and cause another problem of controlling moisture when massively washed.

SUMMARY OF THE INVENTION

One embodiment of the present invention provides a positive active material for a rechargeable lithium battery capable of preventing gelation of an electrode slurry, suppressing gas generation during battery operation by surface-treating a nickel-rich-based positive active material with a compound capable of reacting with a lithium compound remaining on the surface thereof to remove the lithium compound, and controlling a side reaction between an electrode and an electrolyte solution due to a stable coating layer on the surface of the compound, and a rechargeable lithium battery having improved safety, high rate characteristics, cycle-life characteristics, and the like.

In one embodiment of the present invention, a positive active material for a rechargeable lithium battery that includes a nickel-containing lithium transition metal composite oxide and a coating layer positioned on the surface of the lithium transition metal composite oxide is provided, wherein the coating layer includes vanadium oxide, lithium vanadium oxide, or a combination thereof.

The lithium transition metal composite oxide may include about 60 mol % or more of nickel based on the total amount of a transition metal.

The lithium transition metal composite oxide may include a compound represented by the following Chemical Formula 1.

 [Chemical Formula 1]

In the above Chemical Formula 1, $M^1$ and $M^2$ are the same or different and are selected from Co, Mn, Al, Ti, Mg, or Zr, $1 \le a \le 1.05$, $0.6 \le x < 1$, $0.01 < y \le 0.35$, and $0.01 < z \le 0.35$.

The lithium transition metal composite oxide may be doped with vanadium.

The outside of the lithium transition metal composite oxide may be doped with vanadium.

The inside of the lithium transition metal composite oxide includes a compound represented by the following Chemical Formula 1, while the outside thereof includes a compound represented by the following Chemical Formula 2.

$$Li_aNi_xM^1{}_yM^2{}_zO_2 \qquad \text{[Chemical Formula 1]}$$

In the above Chemical Formula 1, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, and $0.01 < z \leq 0.35$.

$$Li_aNi_xM^1{}_yM^2{}_zV_tO_2 \qquad \text{[Chemical Formula 2]}$$

In the above Chemical Formula 2, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, $0.01 < z \leq 0.35$, and $0.001 < t \leq 0.02$.

The coating layer may include $Li_bV_2O_5$ ($0 \leq b \leq 6$).

The coating layer may include $V_2O_5$ and $Li_cV_2O_5$ ($0.05 \leq c \leq 6$).

The outside of the coating layer may include $V_2O_5$, while the inside thereof includes $Li_cV_2O_5$ ($0.05 \leq c \leq 6$).

The coating layer may be included in an amount of about 0.1 to about 5 parts by mole based on 100 parts by mole of a transition metal in the lithium transition metal composite oxide.

Another embodiment of the present invention provides a method of the positive active material for a rechargeable lithium battery, which includes: preparing a nickel-containing lithium transition metal composite oxide; mixing the lithium transition metal composite oxide with a vanadium raw material; coating the vanadium raw material on the surface of the lithium transition metal composite oxide by spray-drying the mixture or using a sol-gel method; heat-treating the lithium transition metal composite oxide coated with the vanadium raw material on the surface; and obtaining a positive active material having a coating layer including vanadium oxide, lithium vanadium oxide, or a combination thereof on the surface of the lithium transition metal composite oxide.

The preparing process of the nickel-containing lithium transition metal composite oxide may specifically include: preparing a nickel-containing transition metal hydroxide in a co-precipitation method; mixing the nickel-containing transition metal hydroxide with a lithium raw material; and heat-treating the mixture.

The nickel-containing lithium transition metal composite oxide may include a compound represented by the following Chemical Formula 1.

$$Li_aNi_xM^1{}_yM^2{}_zO_2 \qquad \text{[Chemical Formula 1]}$$

In the above Chemical Formula 1, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, and $0.01 < z \leq 0.35$.

In the mixing process of the lithium transition metal composite oxide and the vanadium raw material, the vanadium raw material may be added in an amount of about 0.1 to about 5 parts by mole based on 100 parts by mole of the transition metal in the lithium transition metal composite oxide.

In the heat-treating process of the lithium transition metal composite oxide coated with the vanadium raw material on the surface, the heat treatment may be performed at about 300 to about 500° C. for about 1 to about 10 hours.

In the obtained positive active material, the lithium transition metal composite oxide may be doped with vanadium.

In the obtained positive active material, the coating layer may include $V_2O_5$ and $Li_cV_2O_5$ ($0.05 \leq c \leq 6$).

In yet another embodiment of the present invention, a rechargeable lithium battery that includes a positive electrode including the positive active material for a rechargeable lithium battery; a negative electrode; and an electrolyte are provided.

The positive active material for a rechargeable lithium battery according to one embodiment has a small side reaction with an electrolyte solution and almost no lithium compound on the surface, and thus may prevent gelation of an electrode slurry and generation of a gas during battery operation. Accordingly, the rechargeable lithium battery according to one embodiment has excellent stability, high rate characteristics, cycle-life characteristics, and the like.

BRIEF DESCRIPTION OF THE DRAWINGS

FIGS. 11A and 11B are graphs showing whether a particular element is present or not from the surface to the inside of the positive active materials according to Comparative Example 3 and Example 3.

FIGS. 14A and 14B are graphs showing whether a particular element is present or not on the surface of the positive active materials according to Comparative Example 4 and the like.

DETAILED DESCRIPTION

Figure 1:
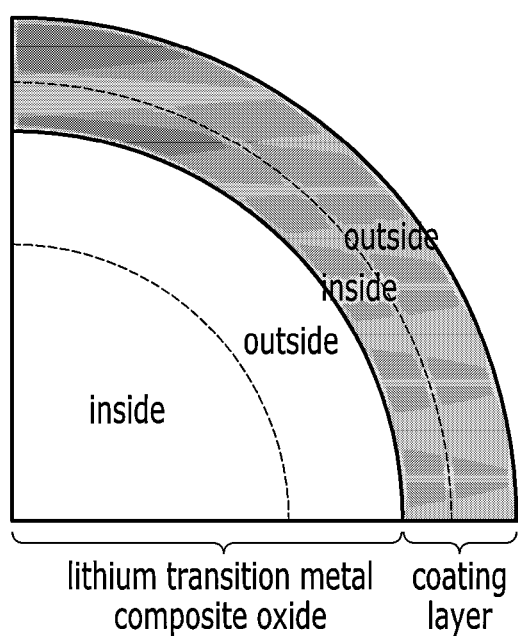
FIG. 1 is a schematic view showing the cross-section of a positive active material according to one embodiment to illustrate the structure of the positive active material.

Hereinafter, embodiments of the present invention are described in detail. However, these embodiments are exemplary, and this disclosure is not limited thereto.

In one embodiment of the present invention, provided is a positive active material for a rechargeable lithium battery includes nickel-containing lithium transition metal composite oxide and a coating layer positioned on the surface of the lithium transition metal composite oxide, wherein the coating layer includes vanadium oxide.

As for a nickel-containing positive active material, lithium impurities such as $Li_2CO_3$, LiOH, and the like are present on the surface, and cause gelation during manufacture of an electrode slurry and deteriorate uniformity of an electrode plate. In addition, the lithium impurities have a problem of forming initial irreversible capacity and generating gas as well as hindering movement of lithium ions during battery operation.

However, the positive active material according to one embodiment includes nickel and suppresses gelation of the electrode slurry, gas generation, and the like, since the coating layer includes vanadium oxide and plays a role of removing lithium impurities, and thus improves battery characteristics such as high rate capability, cycle-life characteristics, and the like.

The lithium transition metal composite oxide may include nickel in an amount of greater than or equal to about 60 mol %, specifically greater than or equal to about 65 mol %, greater than or equal to about 70 mol %, greater than or equal to about 75 mol %, and greater than or equal to about 80 mol %, based on based on the total amount of a transition metal. In other words, the lithium transition metal composite oxide may be a nickel-rich-based oxide. Herein, the positive active material may realize high capacity with a low cost. A residual lithium problem tends to be severe as the amount of the nickel is increased, but the positive active material according to one embodiment includes nickel in a large amount but may overcome the problem since the residual lithium is removed.

Specifically, the lithium transition metal composite oxide may include nickel in an amount of greater than or equal to about 60 mol %, greater than or equal to about 65 mol %, greater than or equal to about 70 mol %, greater than or equal to about 75 mol %, and greater than or equal to about 80 mol %, or less than or equal to about 90 mol %, based on the total amount of a transition metal.

The lithium transition metal composite oxide may specifically include a compound represented by the following Chemical Formula 1.

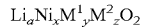  [Chemical Formula 1]

In the above Chemical Formula 1, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, and $0.01 < z \leq 0.35$.

The x is a nickel mole ratio and may be in a range of about $0.65 \leq x < 1$, $0.7 \leq x < 1$, about $0.75 \leq x < 1$, about $0.8 \leq x < 1$, about $0.6 \leq x \leq 0.9$, or about $0.7 \leq x \leq 0.9$. The compound represented by the above Chemical Formula 1 may be a positive active material including nickel and having a layered structure.

As a coating layer including vanadium oxide is formed on the surface of the lithium transition metal composite oxide, the surface layer of the composite oxide may be doped with vanadium. In other words, the lithium transition metal composite oxide may be doped with vanadium. Specifically, the outside of the lithium transition metal composite oxide may be doped with vanadium. Herein, the positive active material including the lithium transition metal composite oxide may realize high-capacity and improve cycle-life characteristics, and the like, of a battery.

Herein, the inside of the lithium transition metal composite oxide indicates a part near the core of a particle in the lithium transition metal composite oxide, and the outside thereof indicates a part near the surface thereof as shown in FIG. 1.

For example, the inside of the lithium transition metal composite oxide may include a compound represented by the following Chemical Formula 1, and the outside of the lithium transition metal composite oxide may include a compound represented by the following Chemical Formula 2.

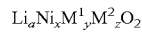  [Chemical Formula 1]

In the above Chemical Formula 1, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, and $0.01 < z \leq 0.35$.

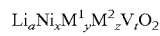  [Chemical Formula 2]

In the above Chemical Formula 2, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, $0.01 < z \leq 0.35$, and $0.001 < t \leq 0.02$.

In the above Chemical Formula 2, the t indicates the amount of doped vanadium, and may be in a range of about 0.001 to about 0.02 or about 0.001 to about 0.01.

The coating layer includes vanadium oxide, lithium vanadium oxide, or a combination thereof. The coating layer may play a role of removing lithium impurities remaining on the surface of the lithium transition metal composite oxide and suppressing a side reaction between the positive active material and an electrolyte solution.

The coating layer may include $Li_bV_2O_5$ ($0 \leq b \leq 6$). Herein, the b in the above Chemical Formula b is a mole ratio of lithium, and may be in a range of about $0 < b \leq 6$, about $0 \leq b \leq 5$, about $0 \leq b \leq 4$, about $0 \leq b \leq 3$, about $0 \leq b \leq 2$, or about $0 \leq b \leq 1$.

Specifically, the coating layer may include $V_2O_5$ and $Li_cV_2O_5$ ($0.05 \leq c \leq 6$). Herein, the c in the above Chemical Formula c is a mole ratio of lithium, and may be in a range of about $0.05 \leq c \leq 6$, about $0.05 \leq c \leq 4$, about $0.05 \leq c \leq 3$, about $0.05 \leq c \leq 2$, or about $0.05 \leq c \leq 1$.

Specifically, the outside of the coating layer includes $V_2O_5$, while the inside of the coating layer may include $Li_cV_2O_5$ ($0.05 \leq c \leq 6$).

Herein, the inside of the coating layer indicates a part near to the lithium transition metal composite oxide, while the outside of the coating layer indicates a part near to the surface thereof as shown in FIG. 1.

The coating layer may be included in an amount of about 0.1 to about 5 parts by mole, specifically, about 0.1 to about 4 parts by mole, about 0.1 to about 3 parts by mole, about 0.1 to about 2 parts by mole, or about 0.1 to about 1 part by mole, based on 100 parts by mole of a transition metal in the lithium transition metal composite oxide. Herein, the coating layer may effectively remove lithium impurities remaining on the surface of the lithium transition metal composite oxide and realize excellent battery performance.

The positive active material may have a particle diameter ranging from about 1 μm to about 20 μm, but this particle diameter range may vary depending on a kind of the lithium transition metal composite oxide. In addition, the coating layer may have various thicknesses depending on a coating concentration.

Another embodiment of the present invention provides a method of manufacturing the positive active material for a rechargeable lithium battery, which includes: preparing a nickel-containing lithium transition metal composite oxide; mixing the lithium transition metal composite oxide with a vanadium raw material; coating the vanadium raw material on the surface of the lithium transition metal composite oxide by spray-drying the mixture or using a sol/gel method; heat-treating the lithium transition metal composite oxide coated with the vanadium raw material on the surface; and obtaining a positive active material having a coating layer including vanadium oxide, lithium vanadium oxide, or a combination thereof on the surface of the lithium transition metal composite oxide.

The above positive active material for a rechargeable lithium battery may be manufactured through the manufacturing method.

Lithium impurities are present on the surface of the nickel-containing lithium transition metal composite oxide, but the manufacturing method according to the one embodiment may provide a positive active material including no lithium impurities by removing lithium impurities.

Specifically, the lithium impurities remaining on the surface of the lithium transition metal composite oxide may react with the vanadium raw material and the like, and thus be changed into lithium vanadium oxide and the like, and thus this lithium vanadium oxide and the like may consist of the coating layer along with vanadium oxide and the like. Accordingly, the obtained positive active material may be free from the lithium impurities.

When the positive active material according to the one embodiment is applied to a battery, gelation of the electrode slurry, gas generation, and the like may be suppressed, and accordingly high rate characteristics, cycle-life characteristics, and the like may be improved.

The preparing process of the nickel-containing lithium transition metal composite oxide may specifically include: preparing nickel-containing transition metal hydroxide in a co-precipitation method; mixing the nickel-containing transition metal hydroxide with a lithium raw material; and heat-treating the mixture.

The heat treatment may be performed at about 600 to about 900° C. for about 12 to about 24 hours.

The nickel-containing lithium transition metal composite oxide may be a nickel-rich-based oxide including nickel in an amount of greater than or equal to about 60 mol % based on the total amount of a transition metal.

Specifically, the nickel-containing lithium transition metal composite oxide may include a compound represented by the following Chemical Formula 1.

$$Li_aNi_xM^1{}_yM^2{}_zO_2$$ [Chemical Formula 1]

In the above Chemical Formula 1, $M^1$ and $M^2$ are the same or different and are selected from Co, Mn, Al, Ti, Mg, or Zr, $1 \leq a \leq 1.05$, $0.6 \leq x < 1$, $0.01 < y \leq 0.35$, and $0.01 < z \leq 0.35$.

In the mixing process of the lithium transition metal composite oxide and the vanadium raw material, the vanadium raw material may be added in an amount of about 0.1 to about 5 parts by mole, specifically, about 0.1 to about 4 parts by mole, about 0.1 to about 3 parts by mole, about 0.1 to about 2 parts by mole, or about 0.1 to about 1 part by mole, based on 100 parts by mole of a transition metal in the lithium transition metal composite oxide. Herein, a coating layer is formed and thus may effectively remove lithium impurities remaining on the surface of the lithium transition metal composite oxide and improve battery performance.

The heat-treating process of the vanadium raw material coated on the surface of the lithium transition metal composite oxide may be performed at about 300 to about 500° C. for about 1 to about 10 hours. Herein, the coating layer becomes stable, and the lithium impurities remaining on the surface of the lithium transition metal composite oxide may be effectively removed.

In yet another embodiment of the present invention, a rechargeable lithium battery includes: a positive electrode including the positive active material for a rechargeable lithium battery; a negative electrode; and an electrolyte.

The positive electrode is manufactured by mixing the positive active material according to one embodiment of the present invention, a conductive material, a binder, and a solvent to prepare a positive active material composition, then directly coating the positive active material composition on an aluminum current collector and drying it. Alternatively, the positive active material composition is coated on a separate support and then peeled off from the supporter. Then, the film is laminated on an aluminum current collector.

The conductive material may be specifically carbon black, graphite, a metal powder, and the like. The binder may be a vinylidene fluoride/hexafluoropropylene copolymer, polyvinylidene fluoride, polyacrylonitrile, polymethylmethacrylate, polytetrafluoroethylene, or a mixture thereof. The solvent may be N-methylpyrrolidone, acetone, tetrahydrofuran, decane, and the like. Herein, the contents of the positive active material, the conductive material, the binder, and the solvent may be equivalent to those conventionally used in a rechargeable lithium battery.

The negative electrode is manufactured by mixing a negative active material, a binder, and a solvent to prepare a negative active material composition, and directly coating the negative active material composition on a copper current collector or laminating a negative active material film on a copper current collector after coating the negative active material composition on a separate support and peeling off the negative active material film like the positive electrode. Herein, the negative active material composition may further include a conductive material if necessary.

The negative active material may be a material capable of intercalating/deintercalating lithium ions, and may include, for example, a lithium metal or a lithium alloy, coke, artificial graphite, natural graphite, an organic polymer compound combusted product, carbon fiber, and the like. In addition, the conductive material, the binder, and the solvent are the same as those used for the above positive electrode.

The separator materials include polyethylene, polypropylene, and polyvinylidene fluoride, or a multi-layer thereof, and it is used in a lithium rechargeable battery, and for example is a polyethylene/polypropylene double-layered separator, a polyethylene/polypropylene/polyethylene triple-layered separator, or a polypropylene/polyethylene/polypropylene triple-layered separator.

The electrolyte charged for a rechargeable lithium battery may include a non-aqueous electrolyte, a solid electrolyte, or the like, in which a lithium salt is dissolved.

The solvent for a non-aqueous electrolyte includes, but is not limited to: cyclic carbonates such as ethylene carbonate, propylene carbonate, butylene carbonate, vinylene carbonate, and the like; linear carbonates such as dimethyl carbonate, methylethyl carbonate, diethyl carbonate, and the like; esters such as methyl acetate, ethyl acetate, acetic acid propyl, methyl propionate, ethyl propionate, ɣ-butyrolactone, and the like; ethers such as 1,2-dimethoxyethane, 1,2-diethoxyethane, tetrahydrofuran, 1,2-dioxane, 2-methyltetrahydrofuran, and the like; nitriles such as acetonitrile and the like; amides such as dimethylformamide and the like; and the like. They may be used singularly or in plural. In particular, the solvent may be a mixed solvent of a cyclic carbonate and a linear carbonate.

The electrolyte may include a gel-type polymer electrolyte prepared by impregnating an electrolyte solution in a polymer electrolyte such as polyethylene oxide, polyacrylonitrile, and the like, or an inorganic solid electrolyte such as LiI and Li3N, but is not limited thereto.

The lithium salt includes at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI.

The following examples illustrate the present invention in more detail. However, it is understood that the present invention is not limited by these examples.

Example 1

$Ni_{0.75}Co_{0.11}Mn_{0.14}(OH)_2$ (average particle diameter: about 11 μm) prepared in a co-precipitation method is uniformly mixed with LiOH, and the mixture is fired at 750° C. under an air atmosphere for 18 hours, manufacturing $LiNi_{0.75}Co_{0.11}Mn_{0.14}O_2$.

A vanadium starting material such as vanadium oxytripropoxide, vanadyl acetylacetonate, and ammonium vanadate is measured to be 0.4 mol % of a transition metal in an active material and dissolved in 100 ml of an ethanol solvent, and then uniformly dispersed at 65° C. for 1 hour, obtaining a coating solution. The $LiNi_{0.75}Co_{0.11}Mn_{0.14}O_2$ is added to the coating solution and then uniformly dispersed, obtaining a mixed solution. The mixed solution is heated at 110° C. for 1 hour to evaporate the ethanol. In order to adopt a spray-drying method, the mixed solution is injected into a spray drier heated up to 200° C. at a predetermined speed while the mixed solution is agitated and taken from the lower part of the spray drier.

This mixed solution is coated on the surface of the active material through treatment in the spray drying method or a sol-gel method. Then, this dried powder is fired at 400° C. for 3 hours, manufacturing a positive active material treated with various layers on the surface.

The positive active material and a carbon black conductive material are added to a solution obtained by dissolving a polyvinylidene fluoride binder in an N-methyl-2-pyrrolidone solvent, preparing a positive active material slurry. Herein, the positive active material, the conductive material, and the binder are mixed in a weight ratio of 92:4:4. The slurry is coated on an Al foil and dried at 110° C. for 600 minutes, manufacturing a positive electrode. The positive electrode is used with a lithium metal as a negative electrode and a 1.15 M $LiPF_6$ and EC/DMC/DEC (volume ratio of 3/4/3) mixed solution as an electrolyte solution, manufacturing a coin cell having a half-cell size of CR2016.

Example 2

A positive active material and a cell are manufactured according to the same method as Example 1, except for using $LiNi_{0.8}Co_{0.1}Mn_{0.1}O_2$ instead of the $LiNi_{0.75}Co_{0.11}Mn_{0.14}O_2$.

Example 3

A positive active material and a cell are manufactured according to the same method as Example 1, except for using $LiNi_{0.8}Co_{0.15}Al_{0.05}O_2$ instead of the $LiNi_{0.75}Co_{0.11}Mn_{0.14}O_2$.

Comparative Example 1

A cell is manufactured according to the same method as Example 1, except for using the $LiNi_{0.75}Co_{0.11}Mn_{0.14}O_2$ without a coating process as the positive active material in Example 1.

Comparative Example 2

A cell is manufactured according to the same method as Comparative Example 1, except for using $LiNi_{0.8}Co_{0.1}Mn_{0.1}O_2$ instead of the $LiNi_{0.75}Co_{0.11}Mn_{0.14}O_2$ as the positive active material.

Comparative Example 3

A cell is manufactured according to the same method as Comparative Example 1, except for using $LiNi_{0.8}Co_{0.15}Al_{0.05}O_2$ instead of the $LiNi_{0.75}Co_{0.11}Mn_{0.14}O_2$ as the positive active material.

Comparative Example 4

A cell is manufactured according to the same method as Comparative Example 1, except for using $LiCoO_2$ as the positive active material.

Evaluation of Example 1 and Comparative Example 1

(1) Appearance Evaluation

Figure 2:
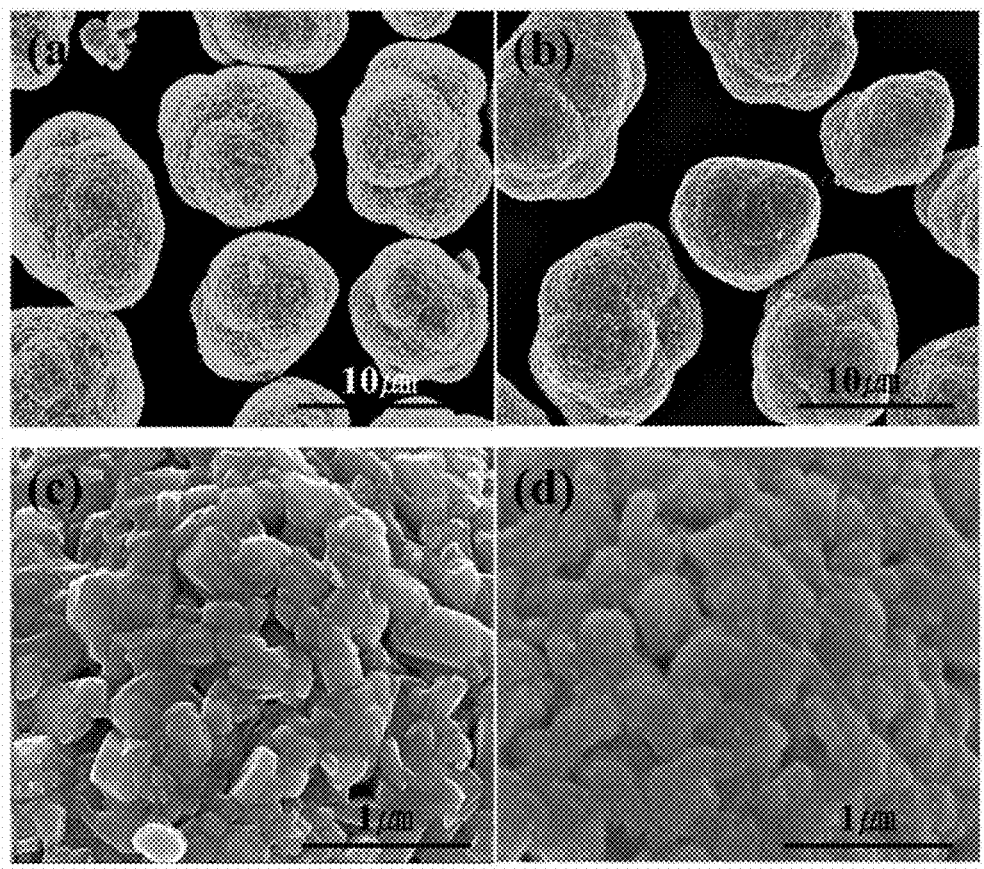
FIG. 2 shows scanning electron microscope (SEM) photographs of positive active materials according to Example 1 and Comparative Example 1.

FIG. 2 is a scanning electron microscope (SEM) photograph showing the positive active materials according to Example 1 and Comparative Example 1. (a) and (c) of FIG. 2 show the positive active material of Comparative Example 1, and (b) and (d) of FIG. 2 show the positive active material of Example 1.

(2) Element and Oxidation Number Change Analyses

FIG. 3 is a graph showing whether a particular element is present or not from the surface to the inside of the positive active materials of Example 1 and Comparative Example 1, and how an oxidation number is changed therein. FIGS. 3A, 3C, and 3E are graphs showing Comparative Example 1, and FIGS. 3B, 3D, and 3F are graphs showing Example 1.

Figure 3A:
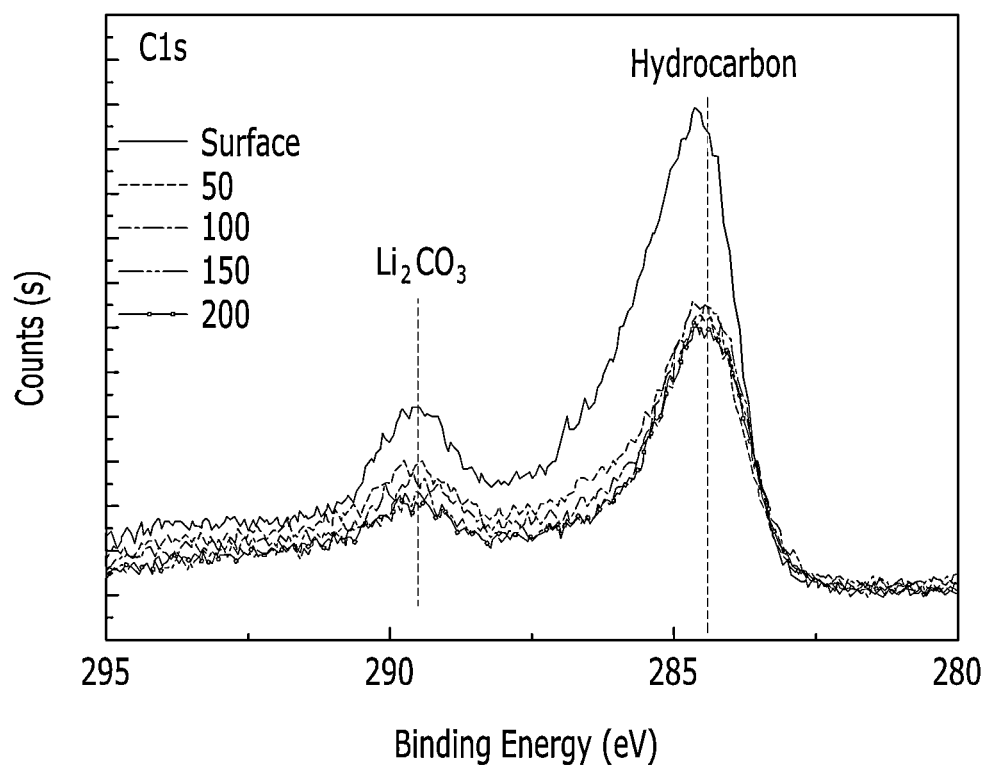
FIGS. 3A, 3C, and 3E are graphs showing whether a particular element is present or not from the surface to the inside of the positive active material according to Comparative Example 1, and how an oxidation number changes therein.
Figure 3B:
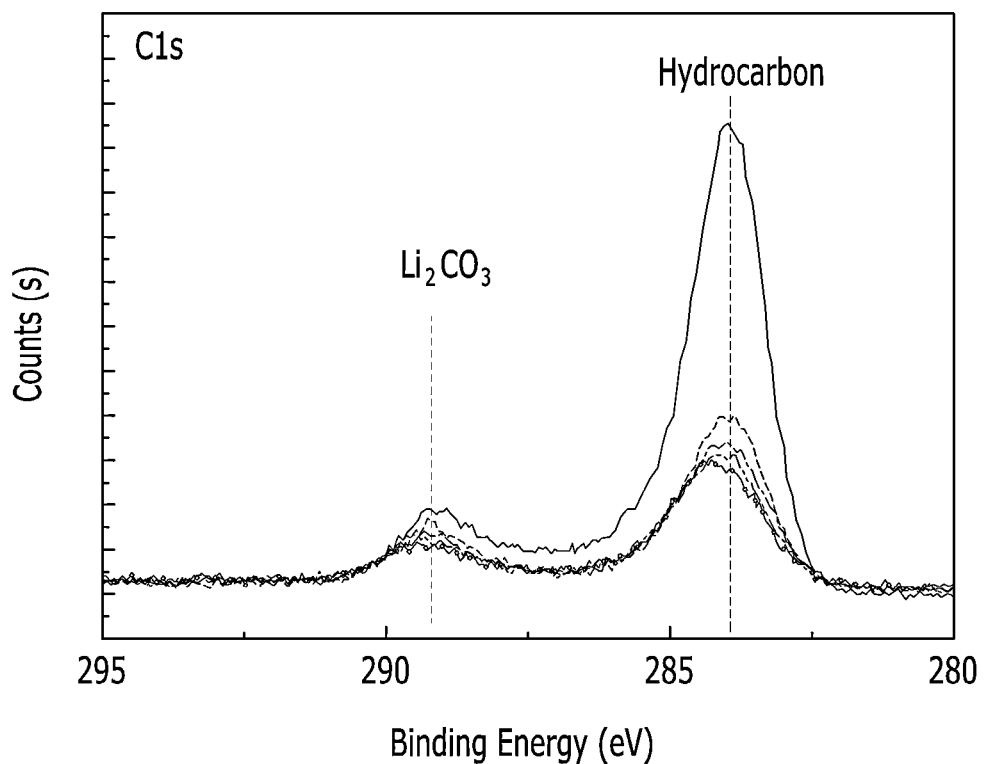
FIGS. 3B, 3D, and 3F are graphs showing whether a particular element is present or not from the surface to the inside of the positive active material according to Example 1, and how an oxidation number changes therein.
Figure 3C:
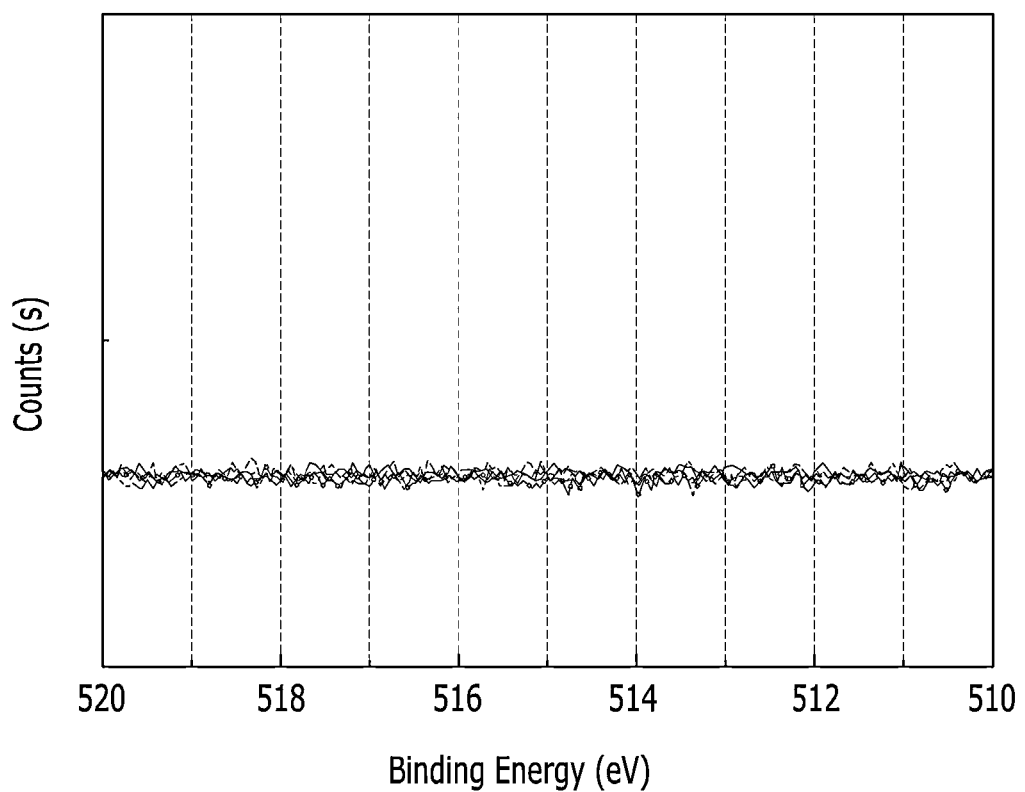
Figure 3D:
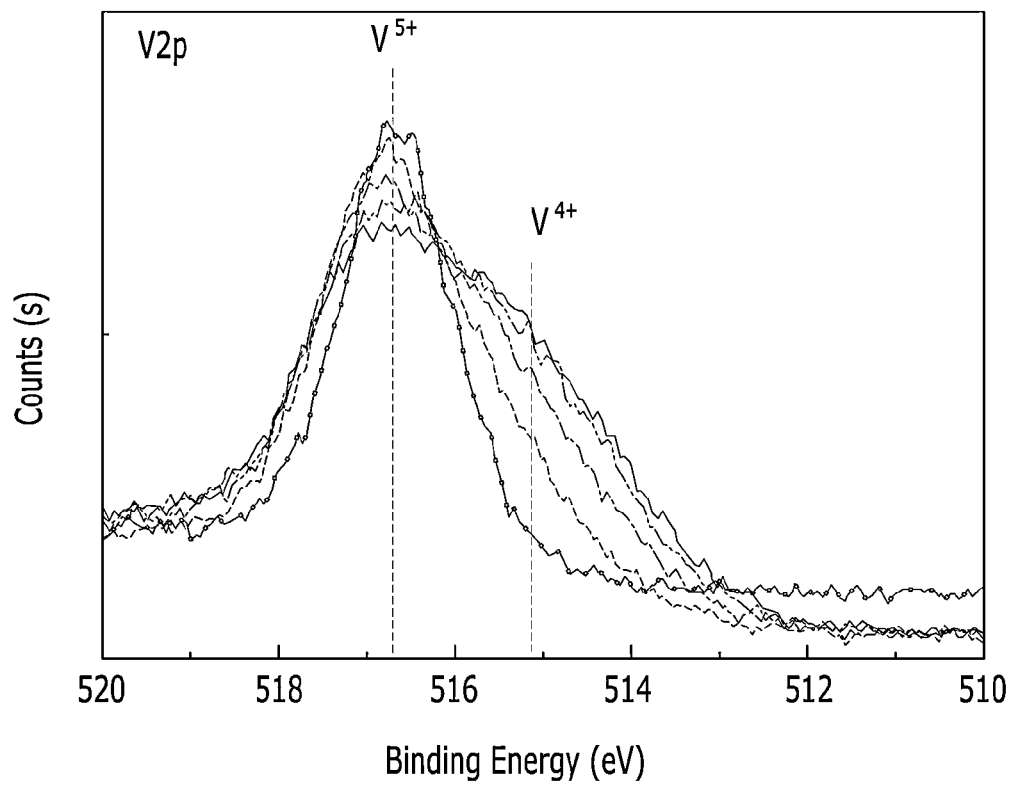
Figure 3E:
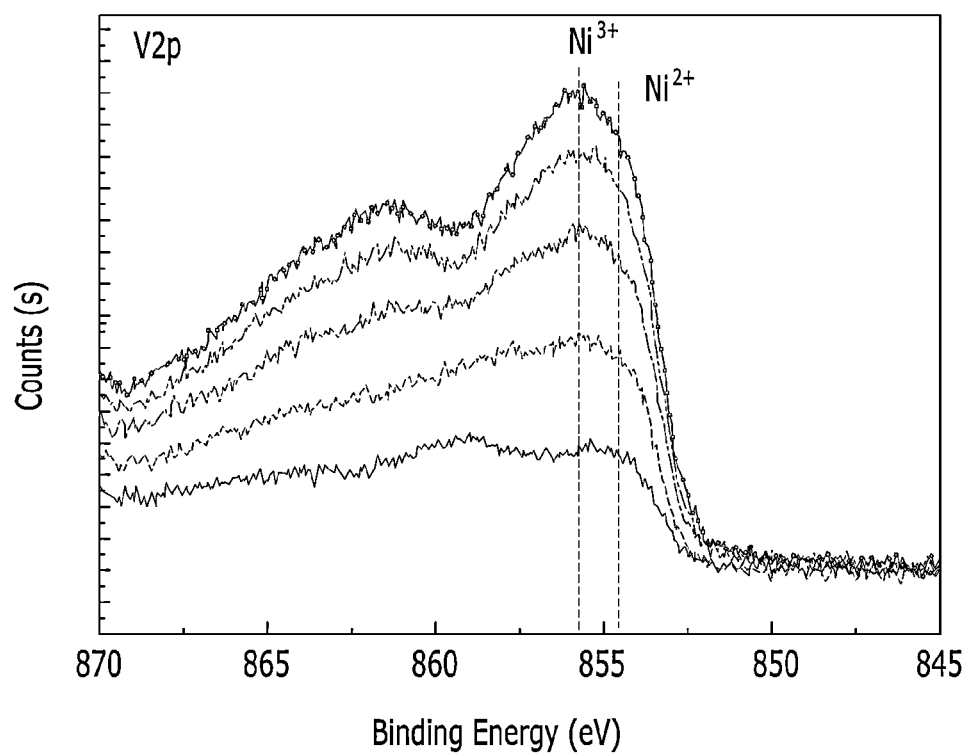
Figure 3F:
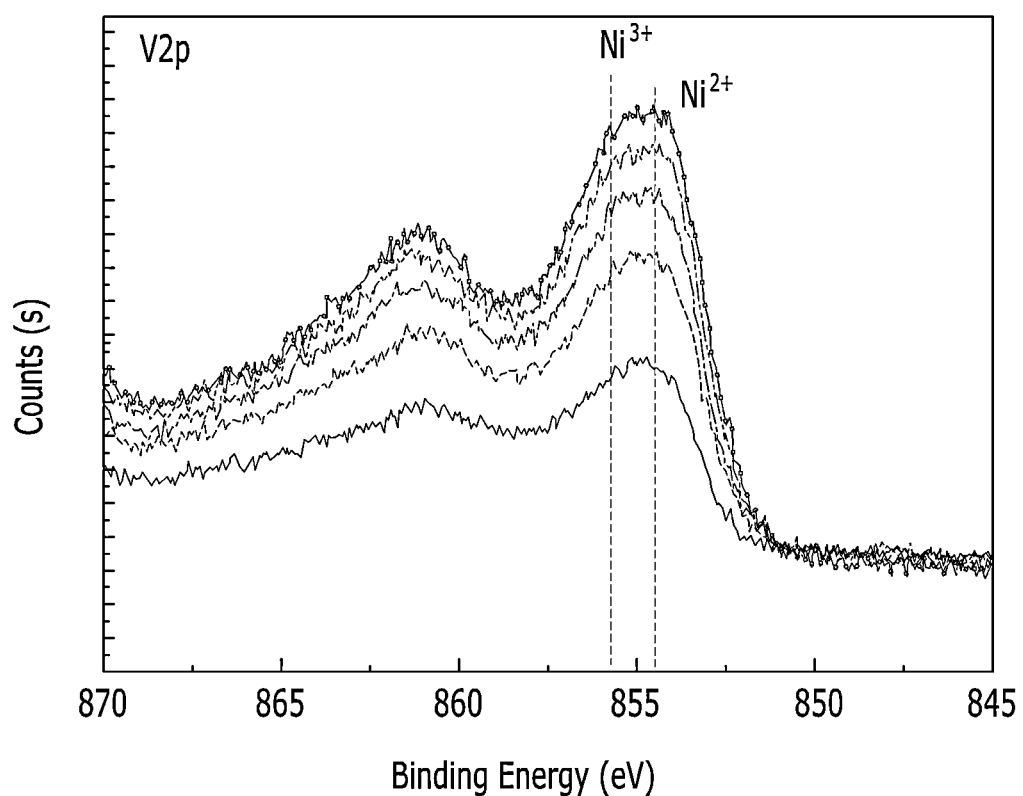

Comparing FIG. 3A with FIG. 3B, FIG. 3A shows that the content of the $Li_2CO_3$ is found around the surface, while FIG. 3B shows that the content of the $Li_2CO_3$ is almost not found. Comparing FIG. 3C with FIG. 3D, vanadium cations are found in a coating layer only in FIG. 3D. Comparing FIG. 3E with FIG. 3F, a main oxidation number of $Ni^{3+}$ in Comparative Example 1 is changed into $Ni^{2+}$ in Example 1 due to a part of vanadium doped on the surface.

(3) Electrochemical Evaluation

Figure 4:
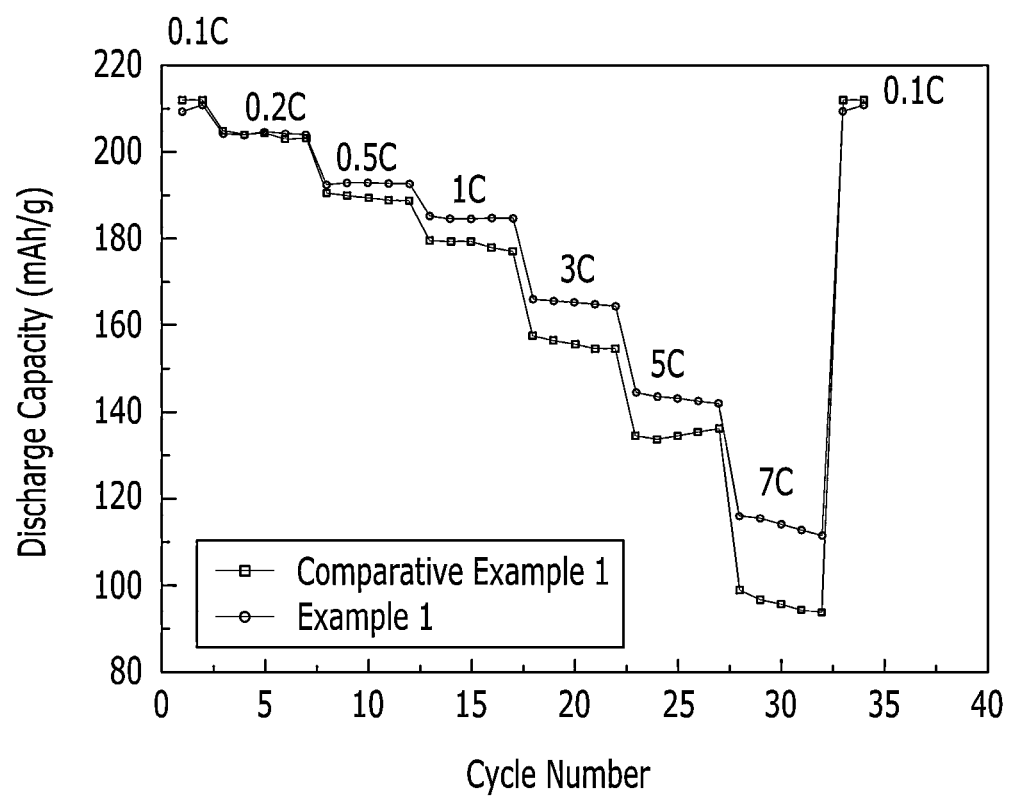
FIG. 4 is a graph showing rate characteristics of battery cells according to Example 1 and Comparative Example 1.

Rate characteristics of the battery cells according to Example 1 and Comparative Example 1 are evaluated from a 0.1 C-rate to a 7 C-rate at room temperature, and the results are provided in FIG. 4. Referring to FIG. 4, the cell of Example 1 shows better output characteristics at a high rate than the cell of Comparative Example 1.

Figure 5:
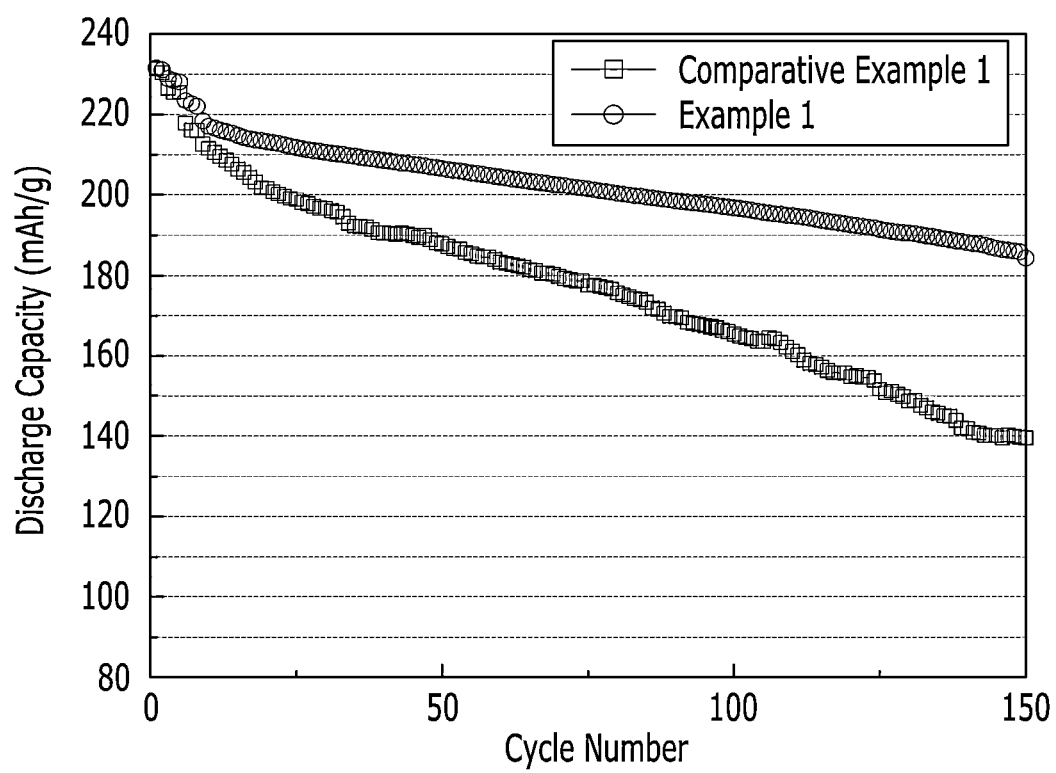
FIG. 5 is a graph showing cycle-life characteristics of the battery cells according to Example 1 and Comparative Example 1.

In addition, cycle-life characteristics of the battery cells of Example 1 and Comparative Example 1 at a high temperature based on 1 C-rate are measured, and the results are provided in FIG. 5. Referring to FIG. 5, the cell of Example 1 shows much better cycle-life characteristics than the cell of Comparative Example 1.

Evaluation of Example 2 and Comparative Example 2

(1) Appearance Evaluation

Figure 6:
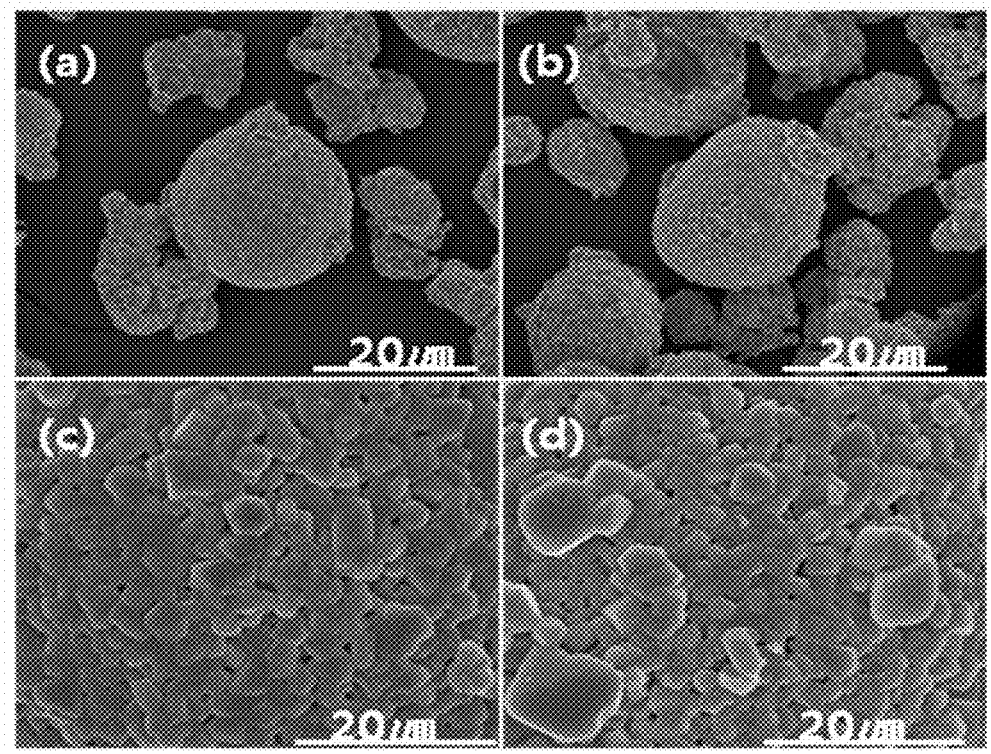
FIG. 6 shows scanning electron microscope (SEM) photographs of positive active materials according to Example 2 and Comparative Example 2.

FIG. 6 shows scanning electron microscope (SEM) photographs of the positive active materials according to Example 2 and Comparative Example 2. (a) and (c) of FIG.

6 show the positive active material of Comparative Example 2, and (b) and (d) of FIG. 6 show the positive active material of Example 2.

(2) Element and Oxidation Number Change Analyses

Figure 7A:
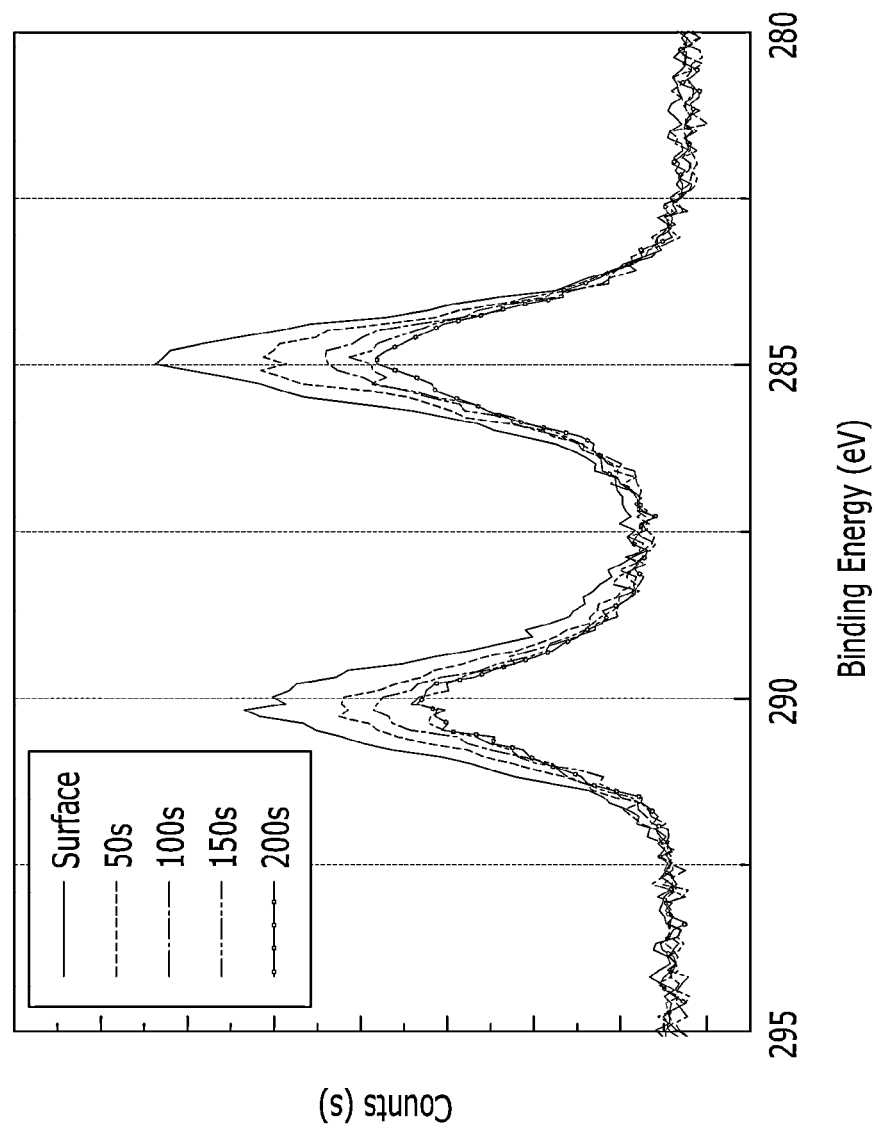
FIGS. 7A and 7B are graphs showing whether a particular element is present or not from the surface to the inside of the positive active materials according to Comparative Example 2 and Example 2.
Figure 7B:
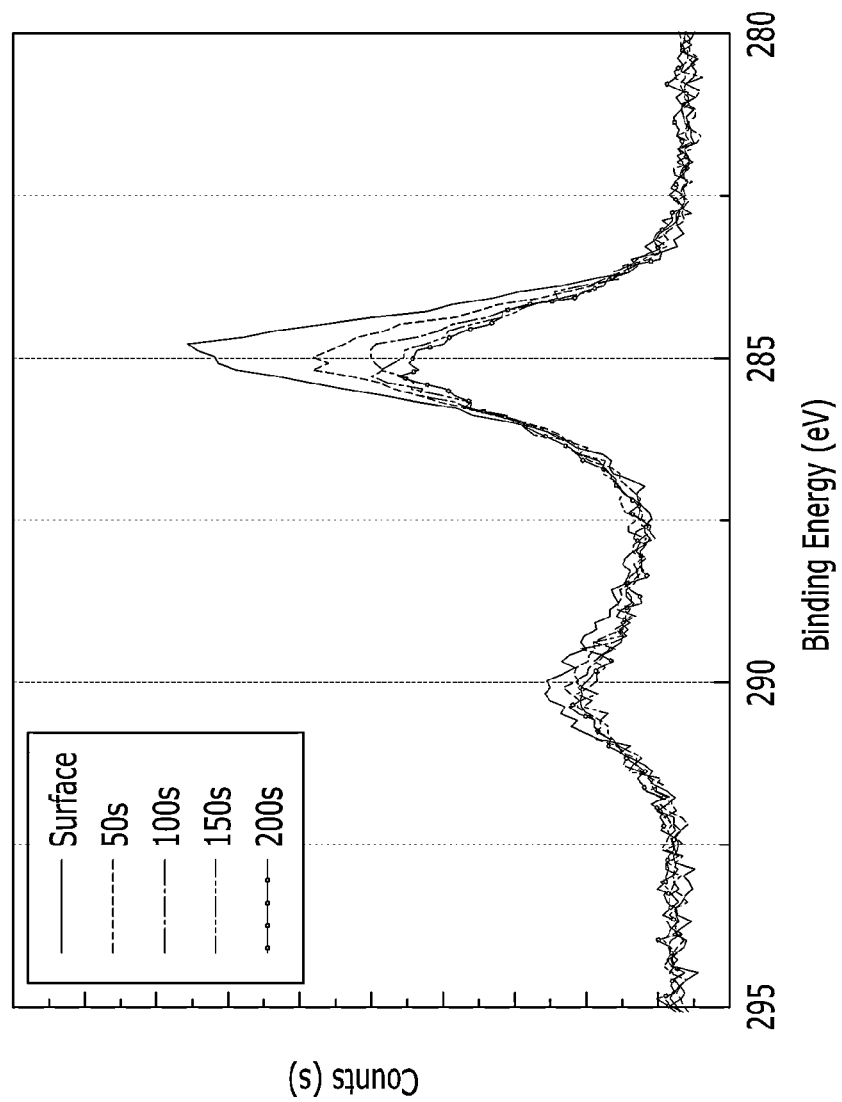

FIGS. 7A and 7B are graphs showing whether a particular element is present or not from the surface to the inside of the positive active materials according to Comparative Example 2 and Example 2, and how an oxidation number is changed therein. In FIGS. 7A and 7B, a left peak indicates the content of the $Li_2Co_3$, while a right peak indicates hydrocarbon.

FIG. 7A shows that a lot of the $Li_2CO_3$ is found around the surface, but FIG. 7B shows that the $Li_2CO_3$ is almost not found.

(3) Electrochemical Evaluation

Figure 8:
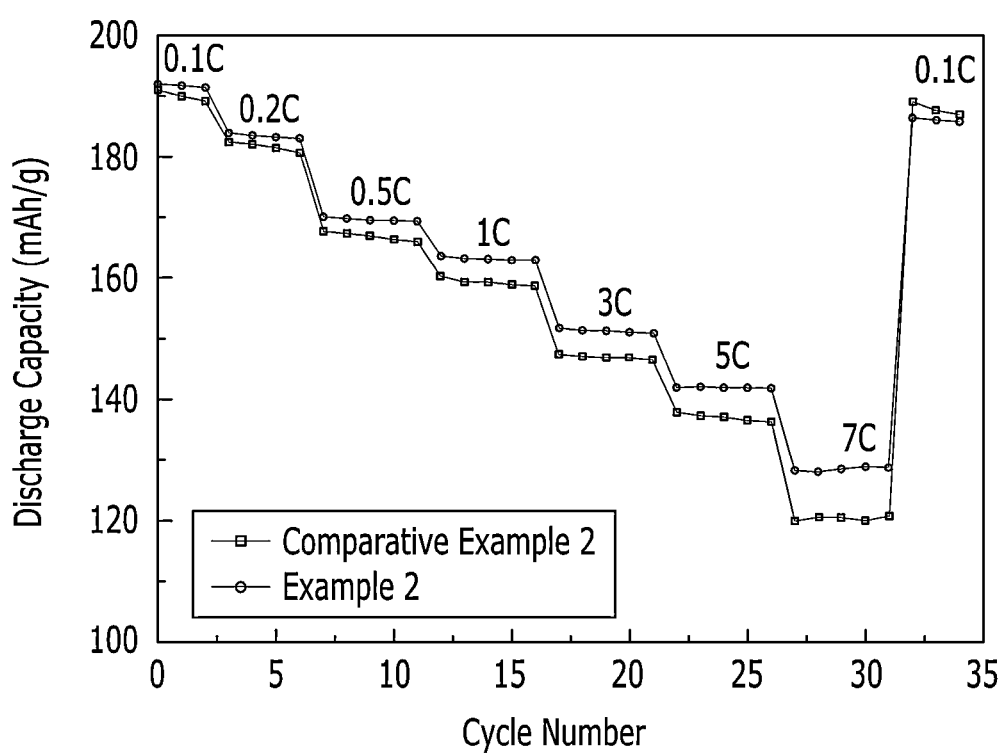
FIG. 8 is a graph showing rate characteristics of the battery cells according to Example 2 and Comparative Example 2.

Rate characteristics of the battery cells according to Example 2 and Comparative Example 2 are evaluated from a 0.1 C-rate to a 10 C-rate at room temperature, and the results are provided in FIG. 8. Referring to FIG. 8, the cell of Example 2 shows much better output characteristics at a high rate than the cell of Comparative Example 2.

Figure 9:
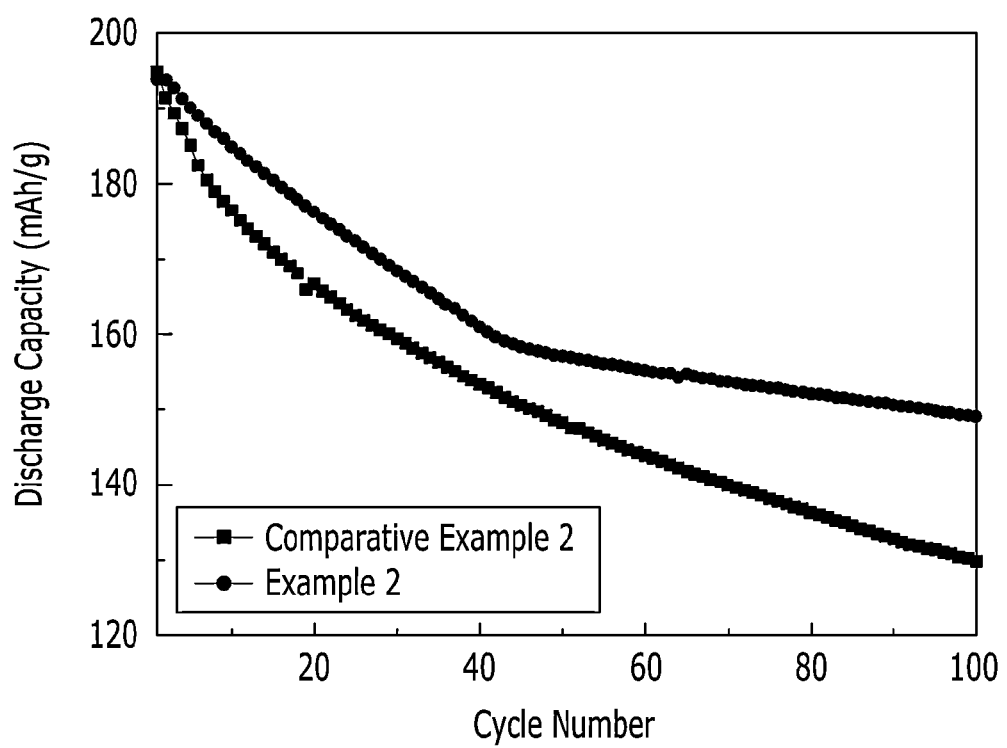
FIG. 9 is a graph showing cycle-life characteristics of the battery cells according to Example 2 and Comparative Example 2.

In addition, cycle-life characteristics of the battery cells of Example 2 and Comparative Example 2 are evaluated at a high temperature based on a 1 C-rate, and the results are provided in FIG. 9. Referring to FIG. 9, the cell of Example 2 shows much better cycle-life characteristics than the cell of Comparative Example 2.

Evaluation of Example 3 and Comparative Example 3

(1) Appearance Evaluation

Figure 10:
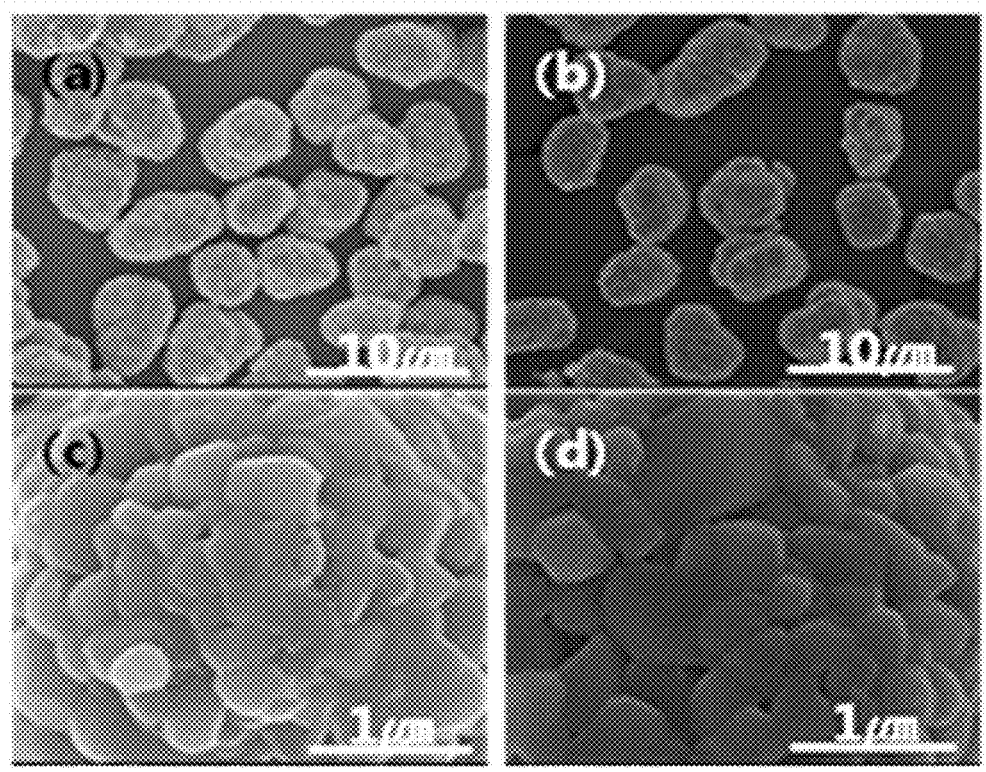
FIG. 10 shows scanning electron microscope (SEM) photographs of positive active materials according to Example 3 and Comparative Example 3.

FIG. 10 is a scanning electron microscope (SEM) photograph showing the positive active materials according to Example 3 and Comparative Example 3. (a) and (c) of FIG. 10 show the positive active material of Comparative Example 3, and (b) and (d) of FIG. 10 show the positive active material of Example 3.

(2) Element and Oxidation Number Change Analyses

Figure 11B:
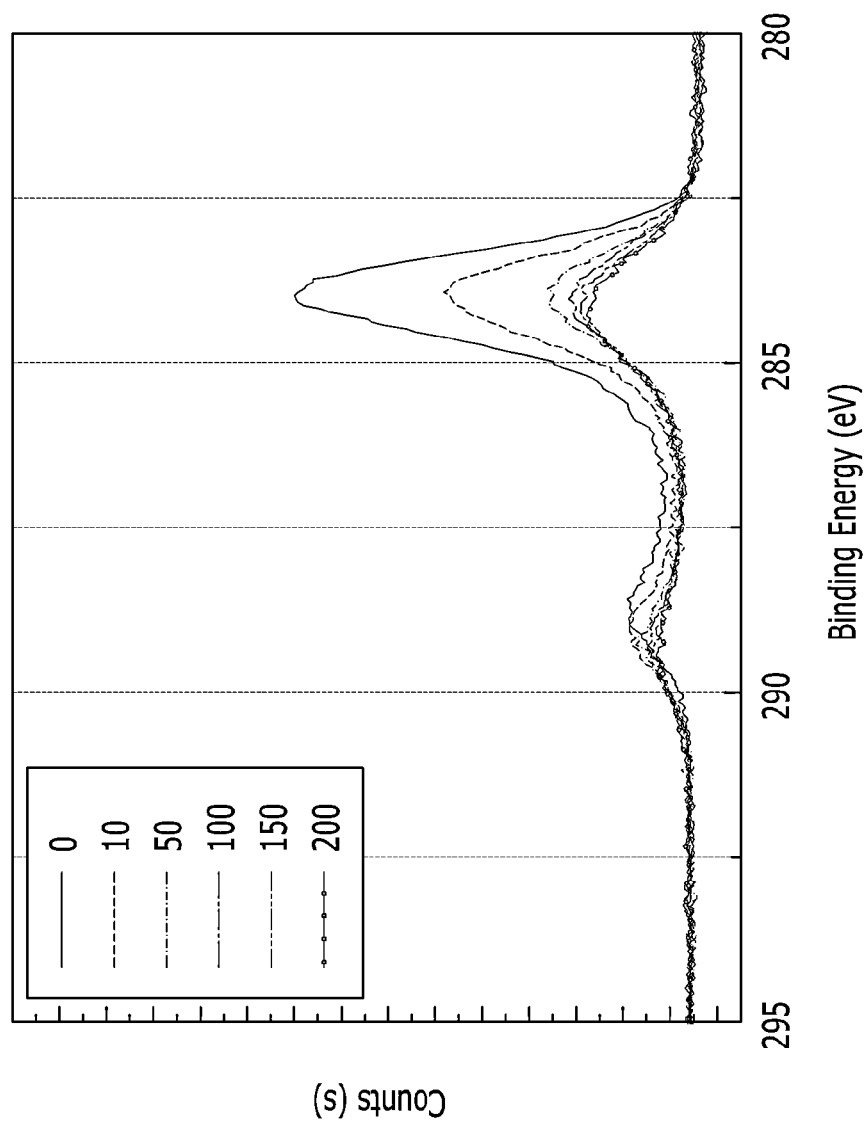

FIGS. 11A and 11B are graphs showing whether a particular element is present or not from the surface to the inside of the positive active materials of Comparative Example 3 and Example 3. In FIGS. 11A and 11B, a left peak indicates the content of the $Li_2Co_3$, while a right peak indicates hydrocarbon.

FIG. 11A shows that a lot of the $Li_2CO_3$ is found around the surface, but FIG. 11B shows that the $Li_2CO_3$ is almost not found.

(3) Electrochemical Evaluation

Figure 12:
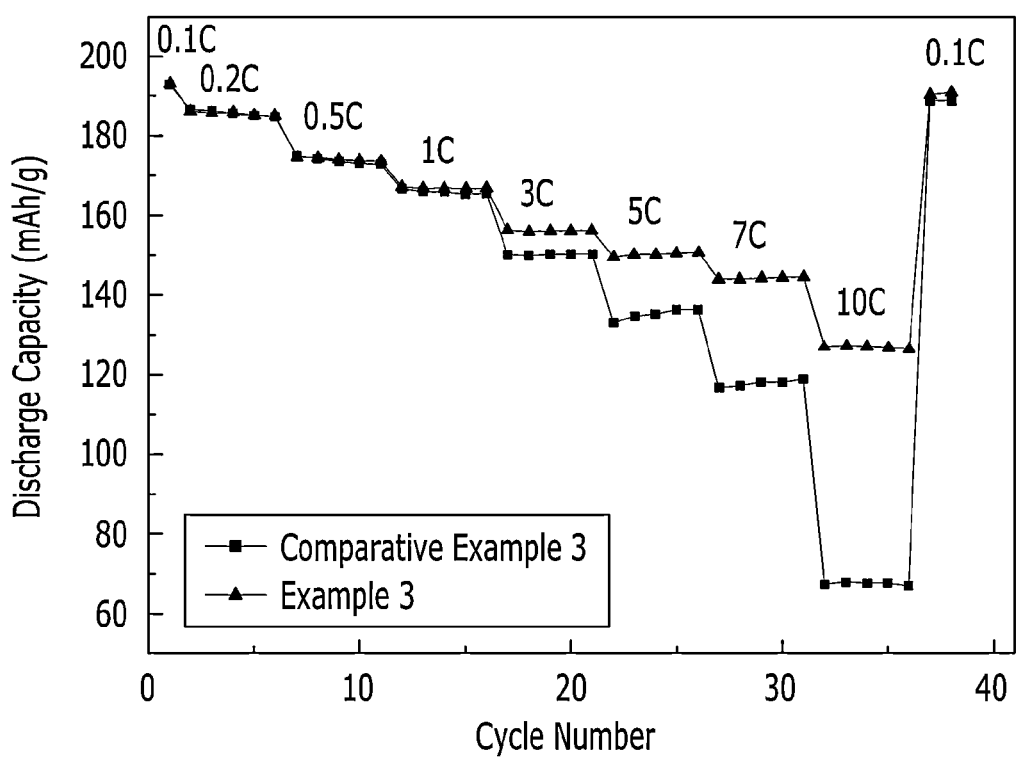
FIG. 12 is a graph showing rate characteristics of battery cells according to Example 3 and Comparative Example 3.

Rate characteristics of the battery cells of Example 3 and Comparative Example 3 are evaluated from a 0.1 C-rate to a 10 C-rate at room temperature, and the results are provided in FIG. 12. Referring to FIG. 12, the battery cell of Example 3 shows much better output characteristics at a high rate than the cell of Comparative Example 3.

Figure 13:
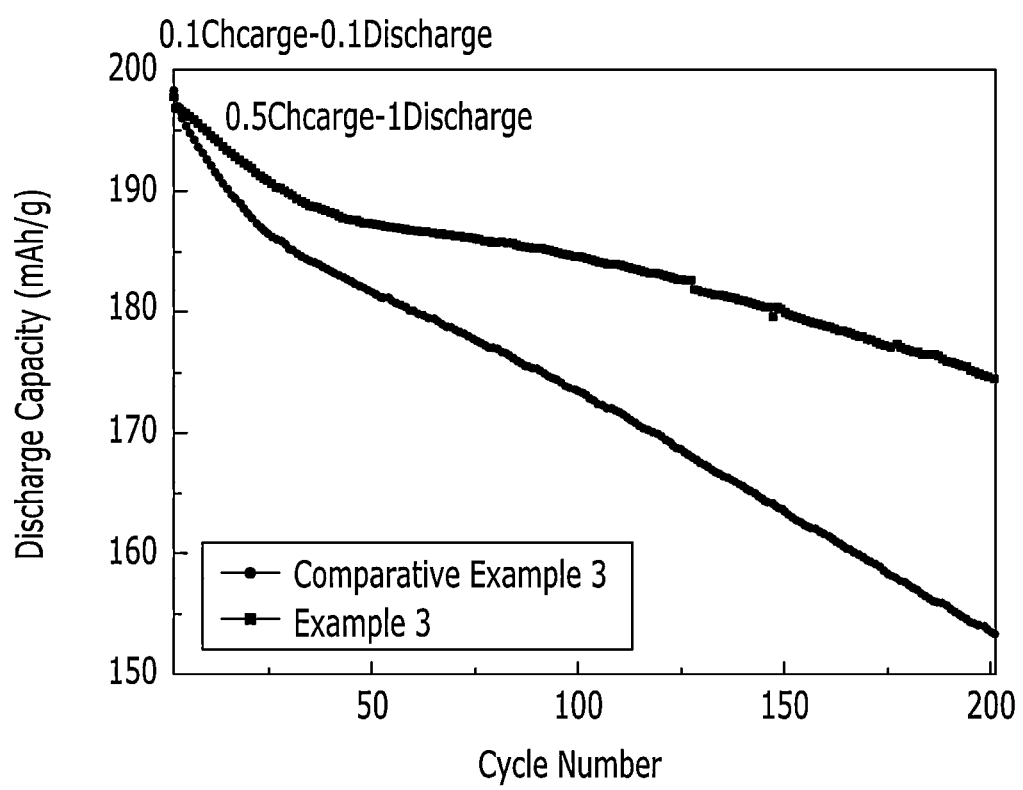
FIG. 13 is a graph showing cycle-life characteristics of the battery cells according to Example 3 and Comparative Example 3.

In addition, cycle-life characteristics of the battery cells of Example 3 and Comparative Example 3 are evaluated at a high temperature based on a 1 C-rate, and the results are provided in FIG. 13. Referring to FIG. 13, the cell of Example 3 shows much better cycle-life characteristics than the cell of Comparative Example 3.

Evaluation of Comparative Example 4

Figure 14A:
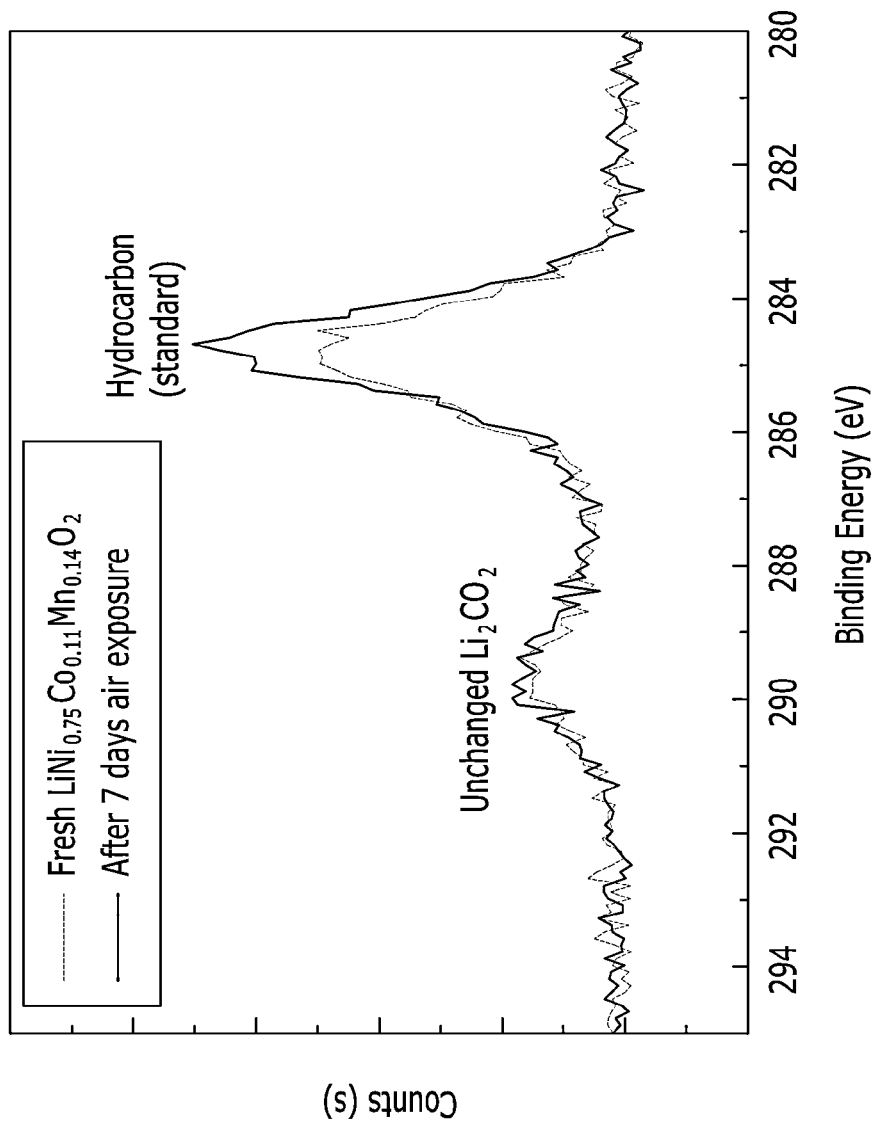
Figure 14B:
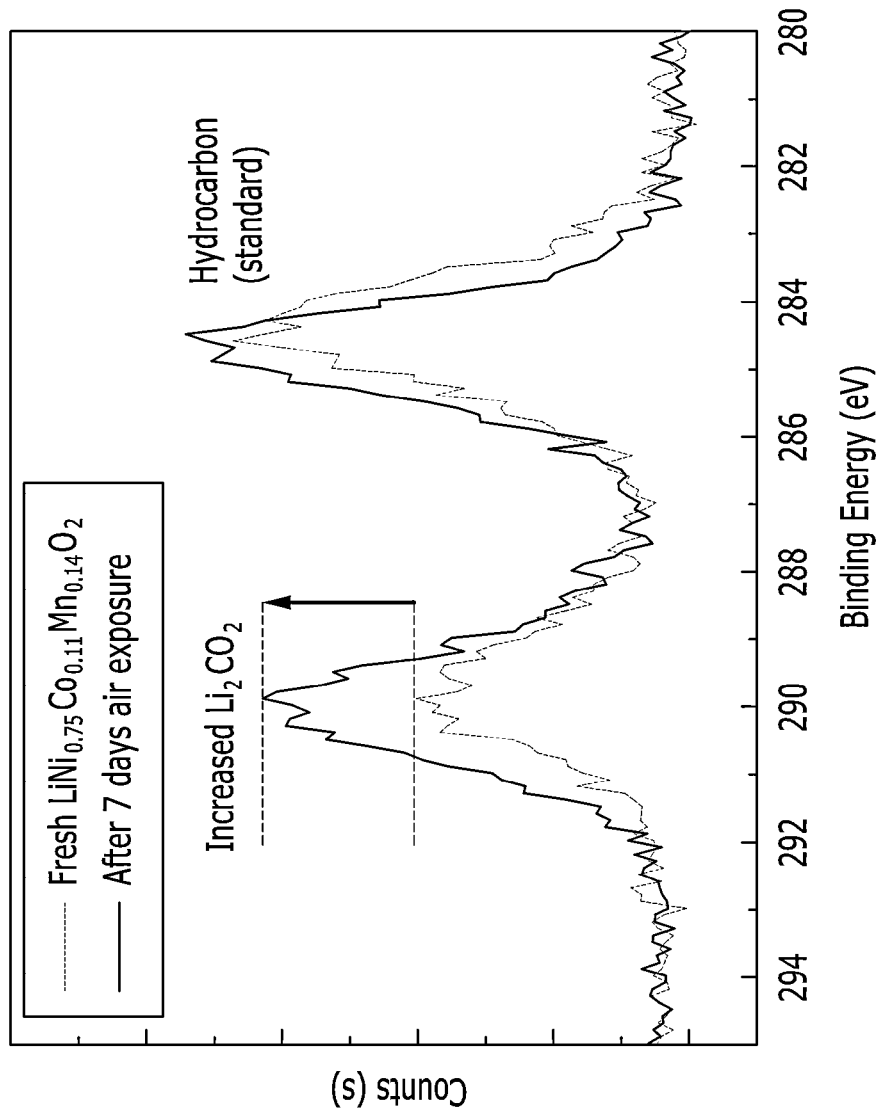

FIGS. 14A and 14B provide an analysis result showing increase and decrease of residual carbonate salt on the surface of the active material after being allowed to stand in air for 7 days. FIG. 14A is a graph showing concentration change of the residual carbonate salt on the surface of the $LiCoO_2$ positive active material of Comparative Example 4, and FIG. 14B is a graph showing concentration change of the residual carbonate salt on the surface of the $LiNi_{0.75}Co_{0.11}Mn_{0.14}O_2$.

As for the $LiNi_{0.75}Co_{0.11}Mn_{0.14}O_2$ in Example 1 and the like, $Li_2CO_3$ and the like remain on the surface and might lead to gelation of the electrode slurry and generate a problem of initial capacity decrease, stability risk, and the like. On the other hand, the $LiCoO_2$ positive active material of Comparative Example 4 has no problem of producing or increasing the residual lithium carbonate on the surface when exposed to air.

A conventional surface treatment technology of $LiCoO_2$ is to only suppress a side reaction between the surface of the active material and an electrolyte solution. A positive active material and a method of manufacturing the positive active material according to one embodiment is improves a problem of a nickel-based active material, that is, a problem generated by the residual carbonate salt on the surface, and has different purpose and method from those of the conventional surface treatment technology of $LiCoO_2$.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A positive active material for a rechargeable lithium battery, comprising:
   a nickel-containing lithium transition metal composite oxide; and
   a coating layer positioned on the surface of the lithium transition metal composite oxide,
   wherein the coating layer comprises $Li_cV_2O_5$ (0.05≤c≤6), and
   wherein an inside of the lithium transition metal composite oxide comprises a compound represented by the following Chemical Formula 1 and an outside of the lithium transition metal composite oxide comprises a compound represented by the following Chemical Formula 2:

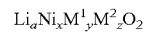  [Chemical Formula 1]

wherein, in the above Chemical Formula 1, $M^1$ and $M^2$ are the same or different and are selected from Co, Mn, Al, Ti, Mg, or Zr, 1≤a≤1.05, 0.6≤x<1, 0.01<y≤0.35, and 0.01<z≤0.35,

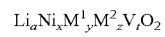  [Chemical Formula 2]

wherein, in the above Chemical Formula 2, $M^1$ and $M^2$ are the same or different and are selected from Co, Mn, Al, Ti, Mg, or Zr, 1≤a≤1.05, 0.6≤x<1, 0.01<y≤0.35, 0.01<z≤0.35, and 0.001<t≤0.02.

2. The positive active material for a rechargeable lithium battery of claim 1, wherein the lithium transition metal composite oxide comprises about 60 mol % or more of nickel based on the total amount of a transition metal.

3. The positive active material for a rechargeable lithium battery of claim 1, wherein the coating layer comprises $V_2O_5$ and $Li_cV_2O_5$ (0.05≤c≤6).

4. The positive active material for a rechargeable lithium battery of claim 3, wherein the outside of the coating layer comprises $V_2O_5$, and the inside of the coating layer comprises $Li_cV_2O_5$ ($0.05 \leq c \leq 6$).

5. The positive active material for a rechargeable lithium battery of claim 1, wherein the coating layer is comprised in an amount of about 0.1 to about 5 parts by mole based on 100 parts by mole of a total amount of transition metals in the lithium transition metal composite oxide, wherein the total amount of transition metals is a total amount of Ni, $M^1$ and $M^2$ included in Chemical Formula 1.

6. A rechargeable lithium battery comprising: a positive electrode including the positive active material for the rechargeable lithium battery of claim 1; a negative electrode; and an electrolyte.

* * * * *